(12) United States Patent
Chandrasekaran et al.

(10) Patent No.: US 9,919,220 B2
(45) Date of Patent: Mar. 20, 2018

(54) TRACKING AND PLAYER-TO-GAME MATCHING SYSTEM FOR ONLINE GAMING

(71) Applicants: Deepak Murali Chandrasekaran, San Mateo, CA (US); Guruprasath Krishnamurthy, Sunnyvale, CA (US); Andrew Gilmore Francis, Saratoga, CA (US)

(72) Inventors: Deepak Murali Chandrasekaran, San Mateo, CA (US); Guruprasath Krishnamurthy, Sunnyvale, CA (US); Andrew Gilmore Francis, Saratoga, CA (US)

(73) Assignee: Roblox Corporation, San Mateo, CA (US)

( * ) Notice: Subject to any disclaimer, the term of this patent is extended or adjusted under 35 U.S.C. 154(b) by 25 days.

(21) Appl. No.: 15/145,489

(22) Filed: May 3, 2016

(65) Prior Publication Data
US 2017/0319967 A1  Nov. 9, 2017

(51) Int. Cl.
| A63F 13/00 | (2014.01) |
| A63F 13/795 | (2014.01) |
| A63F 13/35 | (2014.01) |
| A63F 13/792 | (2014.01) |

(52) U.S. Cl.
CPC ............ *A63F 13/795* (2014.09); *A63F 13/35* (2014.09); *A63F 13/792* (2014.09)

(58) Field of Classification Search
CPC ...................................................... A63F 13/12
See application file for complete search history.

(56) References Cited

U.S. PATENT DOCUMENTS

| 2005/0070359 A1* | 3/2005 | Rodriquez ............. A63F 13/12 463/42 |
| 2006/0287096 A1* | 12/2006 | O'Kelley, II .......... A63F 13/12 463/42 |

* cited by examiner

*Primary Examiner* — Reginald Renwick
(74) *Attorney, Agent, or Firm* — Donald R. Boys; Central Coast Patent Agency, Inc.

(57) ABSTRACT

A video game method has steps for receiving, at a network-connected server providing video games, a request from a first player to enter a particular game, determining by software executing on a processor on the network-connected server, from a non-transitory medium, instances of the particular game already in progress, accessing stored information regarding friends of the first player, determining if one or more friends of the first player are engaged in one or more of the games already in progress, and directing the first player to a particular one of the games already in progress wherein one or more friends of the first player are engaged.

14 Claims, 5 Drawing Sheets

TRACKING AND PLAYER-TO-GAME MATCHING SYSTEM FOR ONLINE GAMING

BACKGROUND OF THE INVENTION

1. Field of the Invention

The present invention is in the field of consumer online gaming and pertains particularly to methods and apparatus for inserting players into games based on existing friendship status of the player to one or more players already active in a game.

2. Discussion of the State of the Art

In the field of interactive online gaming, users subscribe to a game provider service in order to play interactive games on the Internet. Such services often involve membership services and include social interaction services that gamers may utilize to connect to and to become online friends with one another in chat, game play, club membership, and the like. For the purpose of this specification, the term friends is not the colloquial meaning, but the concept of Friends in a social network, where different persons are associated digitally as friends.

When a player currently clicks on a game link (play button), the gaming service looks for running instances of the game hosted on one or more game servers distributed over the data network. Typical routines for player insertion into a running game instance focus primarily on how close on the network the server hosting an instance of the game is to the target player being inserted.

It has occurred to the inventor through empirical research that players tend to stay longer in a game where there are friends of the player also playing in the same running instance of the game. Each player having friends in a gaming system may have a player friendship graph detailing the friendship states between the player and each of the player's friends. Friendship state may include detailed attributes, such as the path to friendship, common friend activities, and shared activity histories. In some cases there may be a hierarchical friendship status, with some friends having priority.

Therefore, what is needed is a method for tracking the instances of friends of a player targeted for game insertion that are actively playing the game to prioritize which among two or more running instances of the game to which the player will be matched to.

BRIEF SUMMARY OF THE INVENTION

In one embodiment of the present invention a method is provided, comprising receiving, at a network-connected server providing video games, a request from a first player to enter a particular game, determining by software executing on a processor on the network-connected server, from a non-transitory medium, instances of the particular game already in progress, accessing stored information regarding friends of the first player, determining if one or more friends of the first player are engaged in one or more of the games already in progress, and directing the first player to a particular one of the games already in progress wherein one or more friends of the first player are engaged.

In one embodiment the stored information regarding friends of the first player includes friend identities, and additional instances of information regarding past associations between the first player and each of the friends. Also in one embodiment the instances of stored information are weighted, and used to determine which one of multiple games in progress involving friends of the first player, that the first player will be directed to play. In one embodiment the instances of stored information include one or more of information regarding common posts, number of games played together in the past, total time playing in a common game, numbers and identities of mutual friends, following state, chat interaction history with the friends, and transaction history with the friends.

In one embodiment the stored information regarding friends of the first player includes the first player's preferences for friends to be joined in a game, and wherein the system uses the preferences in determining which one of multiple games in progress involving friends of the first player, that the first player will be directed to play. In one embodiment the preferences of the first player include a preference to not play in a same game with individual ones of the friends. And in one embodiment friends of the first player are assigned a priority between no play and always OK to play in the same game.

In another aspect of the invention a system is provided, comprising a network-connected server executing software on a processor from a non-transitory medium, a game server running games in which individual second players are engaged, and a data repository storing information regarding friends of a first player. Upon receiving at the network-connected server a request from the first player to enter a particular game, the system determines instances of the particular game already in progress, accesses the stored information, determines if one or more friends of the first player are engaged in one or more of the games already in progress, and directs the first player to a particular one of the games already in progress wherein one or more friends of the first player are engaged.

In one embodiment of the method the stored information regarding friends of the first player includes friend identities, and additional instances of information regarding past associations between the first player and each of the friends. In one embodiment the instances of stored information are weighted, and used to determine which one of multiple games in progress involving friends of the first player, that the first player will be directed to play. Also in one embodiment the instances of stored information include one or more of information regarding common posts, number of games played together in the past, total time playing in a common game, numbers and identities of mutual friends, following state, chat interaction history with the friends, and transaction history with the friends.

In one embodiment the stored information regarding friends of the first player includes the first player's preferences for friends to be joined in a game, and wherein the system uses the preferences in determining which one of multiple games in progress involving friends of the first player, that the first player will be directed to play. Also in one embodiment the preferences of the first player include a preference to not play in a same game with individual ones of the friends. And in one embodiment friends of the first player are assigned a priority between no play and always OK to play in the same game.

DETAILED DESCRIPTION OF THE INVENTION

The inventors provide a unique system and method for matching a game player that has selected and initiated an online game to a running game instance that includes one or more of the player's friends actively engaged. The present invention is described in enabling detail using the following examples, which may describe more than one relevant embodiment falling within the scope of the present invention.

Figure 1:
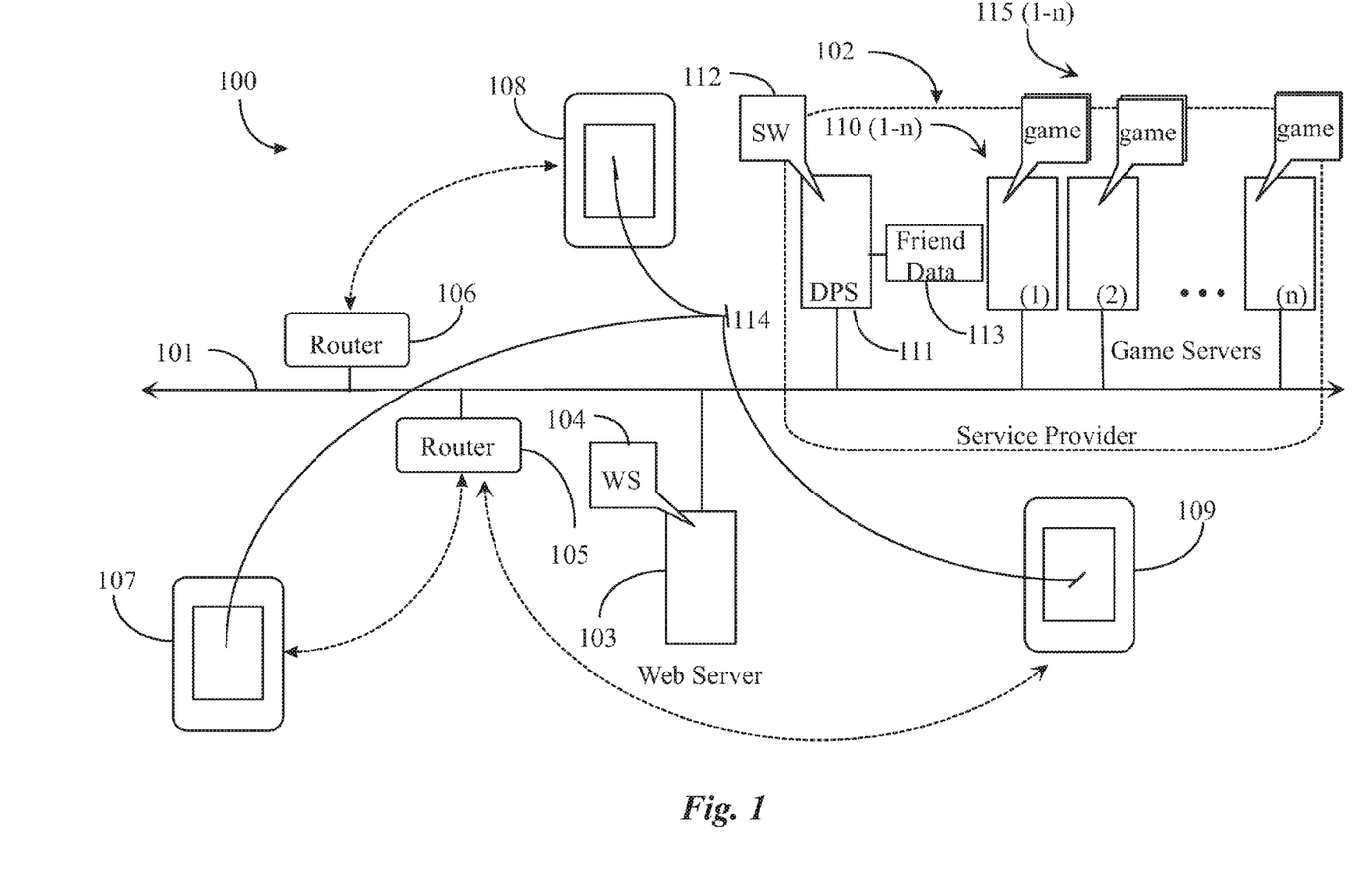
FIG. 1 is an architectural overview of a gaming network supporting game play matching by friend status according to an embodiment of the present invention.

FIG. 1 is an architectural overview of a gaming network 100 supporting game play matching by friend status according to an embodiment of the present invention. Gaming network 100 includes the well-known Internet network illustrated by a network backbone 101. Backbone 101 represents all of the lines, equipment and access points that make up the Internet as a whole, including any connected sub-networks. Therefore, there are no geographic limitations to the practice of the present invention. Backbone 101 supports a gaming service provider domain 102. Provider domain 102 includes equipment and software required to provide online gaming services to consumers who subscribe to such services, typically through a Website. Providing organization 102 may maintain a Website (WS) 104 hosted on a Web server 103 supported by backbone 101 in this example. Server 103 may be maintained by a third-party Web hosting service or an in-house Web hosting service without departing from the spirit and scope of the present invention.

Website 104 may be a contact point between gaming service subscribers and provider 102. Website 104 enables searching or browsing of online games and may advertise or otherwise promote featured or highly popular online games. Website 104 enables secure access and connection to at least one game server. In this example, service provider domain 102 includes game servers 110 (1-$n$). Game servers 110 (1-$n$) may be maintained within a physical location of the service provider or they may be cloud-based and distributed over a larger geographic region. In a preferred implementation they are distributed and in current art known to the inventor, users may connect to the server that is running a selected instance of a game, that is closest to the accessing user's geographic position in the network for latency reduction purposes.

Backbone 101 supports at least one data router. In this case, a data router 105 and a data routed 106, that may function as edge routers or bridges connecting a wired or wireless data network to the wired Internet network 101 through an Internet service provider not illustrated. In this implementation, connection to game server(s) 110 (1-$n$) in domain 102 may be through router 105 or through router 106 from a wireless or wired network, enabling gaming devices or stations, such as a gaming device 107, 108, or 109 depicted herein, to engage in online game play through the respective routers. Devices 107, 108, and 109 may be any wirelessly-capable or tethered computing appliances having browser capability of accessing WS 104 to be redirected to one or more of gaming servers 110 (1-$n$). In this example, devices 107, 108, and 109 are wireless gaming devices such as a smart phone, a tablet computer, a laptop, a gaming station, or similar devices.

Gaming devices 107, 108, and 109 may have a software (SW) gaming application 114 executable therefrom for the purpose of simplifying and specializing gaming experience according to an embodiment of the invention. Application 114 may be acquired by download from WS 104 hosted on Web server 103. Application 114 is typically browser-based and capable of site navigation on the internet network. Application 114 is not specifically required to practice the present invention. In some embodiments it is provided for a mobile-friendly experience for users. Users not having application 114 may nevertheless search and browse games on WS 104. Users having application 114 installed may connect and search games through the application adapted for mobile devices.

Backbone 101 supports a data back-end processing server (DPS) 111 within domain 102 of the service provider. Data processing sever 111 is a back-end server that may subscribe to gaming feeds from servers 110 (1-$n$) and record game play history of gaming subscribers, such as those operating devices 107, 108 and 109. Data processing server 111 also hosts a software application 112. Application 112 enables data server 111 to receive information about the users operating devices 107, 108 and 109 such as their friend graphs data. SW 112 enables, among other tasks, server 111 to match a player who has selected a game using application 114 or WS 104 to one of multiple running game instances 115 (1-$n$) executing on game servers 110 (1-$n$).

Data processing server 111 includes a data repository 113 containing friend graph data representing friend state details for each member of the gaming service. A friend graph is a data model that depicts a user's total friend state with other users of the service. A friend graph may include identification of and other information surrounding the current user's friends. Data may include attributes that dive deep into a friendship state between players such as number of mutual friends, following states, time friends, and who initiated friendship action. The data may also include or may be appended with activity and history data from interactions between the friends, such as number of times in chat together, number of games played together, etc. More detail about friend attributes as used to match players to games with friends is provided later in this specification.

In general use of the invention, a player, such as one of players 107-109, may connect online with the gaming service with or without application 114. The player may search or browse to select a game to play. When the user initiates to play the game, the user may be directed to server 111 for subsequent game matching based on friend graph data of the player. SW 112 in cooperation with game matching SW or acting unilaterally, with game search and match capability, may search for running instances of the game selected by the player, where friend graph data about the player is used by the SW to identify running instances of the game selected by the player where there are one or more friends of the player actively engaged in playing the game. It is noted herein that SW 112 may be integrated with existing game-matching software, or it may be a standalone version of game-matching software having added capability of matching players to games where friends of the player are engaged.

Figure 2:
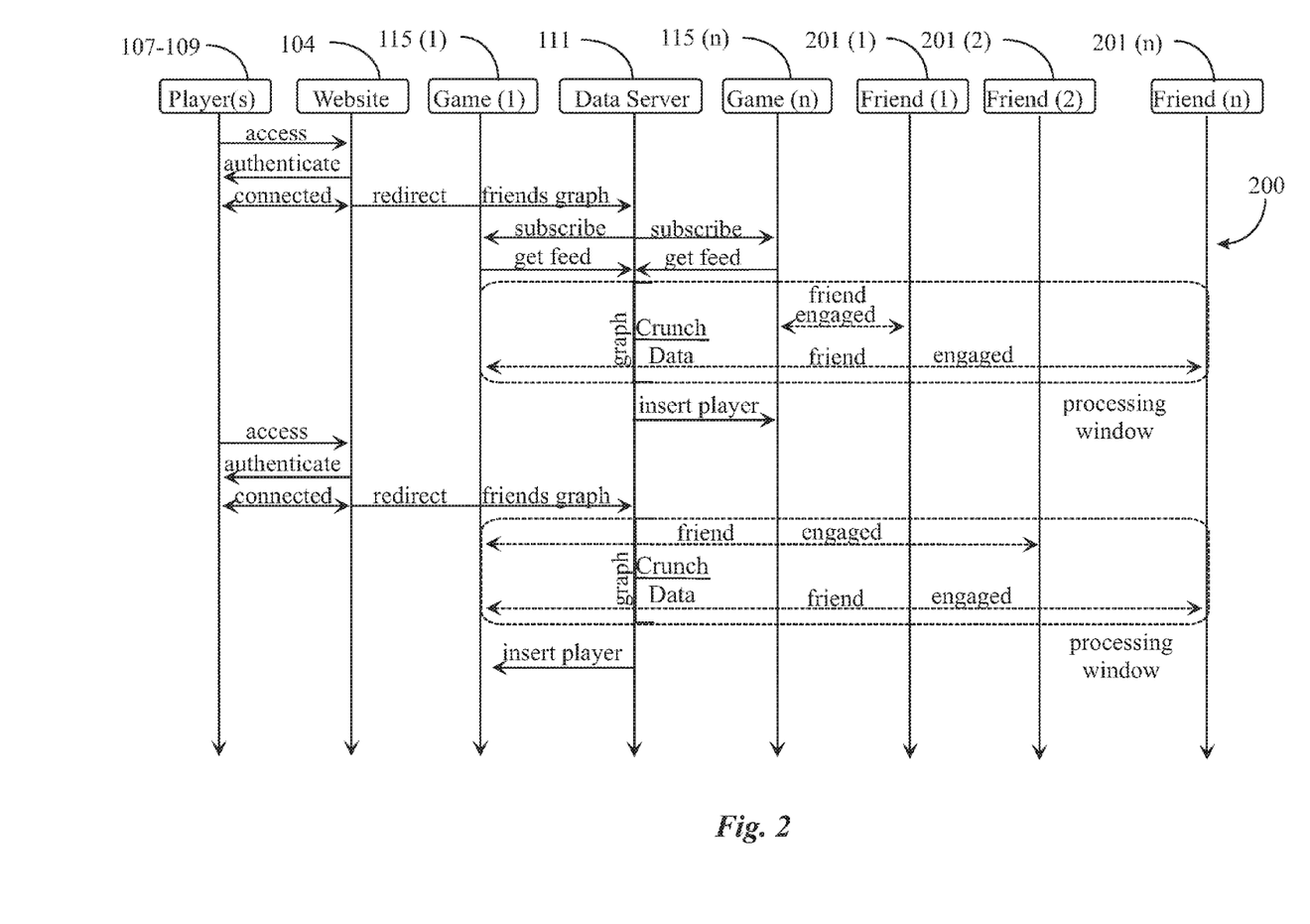
FIG. 2 is a sequence diagram depicting interaction relative to player insertion into a running instance of a game.

FIG. 2 is a sequence diagram 200 depicting interaction between system components relative to player insertion into a running instance of a game, in one implementation of the invention. Sequence diagram 200 includes some basic components that interact in accordance with the present invention. Components depicted in this example may be the same components introduced in FIG. 1 and retain the same element numbers introduced in FIG. 1. Players 107-109 may access Website 104 to search or browse for a game to play online. In this example one of players 107-109 connects to Website 104 to play a game online. Website 104 authenticates the player and the connected player is redirected to data processing server 111. In this implementation, the Website may forward a portion or all of the player's friend graph to data processing server 111 for use in game matching. In another implementation, server 111 may already have unfettered local access to all friend graph data of players that subscribe to the service.

Data processing server 111 may subscribe to game servers 110 (1-n) hosting running instances of games. In this example, server 111 gets server feeds for game instances 115 (1) through 115 (n) representing running instances of the game selected by the player. Data server 111 aided by SW (112) may utilize friend graph data to first see games having one or more of the player's friends engaged in play of the game. In this example, server 111 utilizes knowledge of friends of the player to identify running instances of the selected game where friends are engaged. In this example the SW aids server 111 to identify a friend 201 (1) of the player engaged with a running instance of game 115 (n) and a friend 201 (n) of the player engaged with running instance of game 115 (1).

Data server 111 makes a determination as to which running game instance the player will be inserted into during a brief processing window (broken rounded rectangle). During this process, SW (112) may utilize player friend graph data and run one or more weighting algorithms to determine which game instance with one or more friends of the player engaged is the best one into which to insert the player. Friend graph data may be utilized at more than one level to determine where to insert a player considering available attributes of a friend model detailed later in this specification.

In this example, the first player is inserted by server 111 into game instance 115 (n) based on analysis of friend graph data relative to friends 201 (1) and 201 (n) within the brief processing window. In this case each game instance has one friend of the player engaged. Therefore, in analysis of friend graph data the SW may have weighed one or more attributes of the friends as they relate to the player at a higher level than simply sending the player to the instance having a friend engaged.

In this example sequence, a second player from players 107-109 accesses Website 104, authenticates, connects, and is redirected to server 111 with friend graph data. A difference in this case is that server 111 aided by SW (112) determines that game instance 115 (1) has two of the player's friends engaged, friend 201 (2) and friend 201 (n), while game instance 115 (n) has none of the player's friends engaged. In this case the determination may be made on the lowest level (one or more friends engaged) without considering friend attributes).

It is possible that multiple game instances of a player-selected game have at least one if not more of the player's friends engaged. It is also possible that the player selects a game and it is determined that none of the game instances at the servers include any of the player's friends. In such a case, the player may be matched to a running game instance using other criterion such as network distance from a server. Other combinations are possible lending to a decision made on a higher level than friend identification as enabled through consideration of friend attributes in the friend model. It is also possible that a game instance that includes friends of the player is full or cannot accept an additional player. In such a case the SW may look for another game instance having friends engaged that is not currently full. In one embodiment a buffer is provided so that an instance identified as full may actually accept one more player in a super max state.

Figure 3:
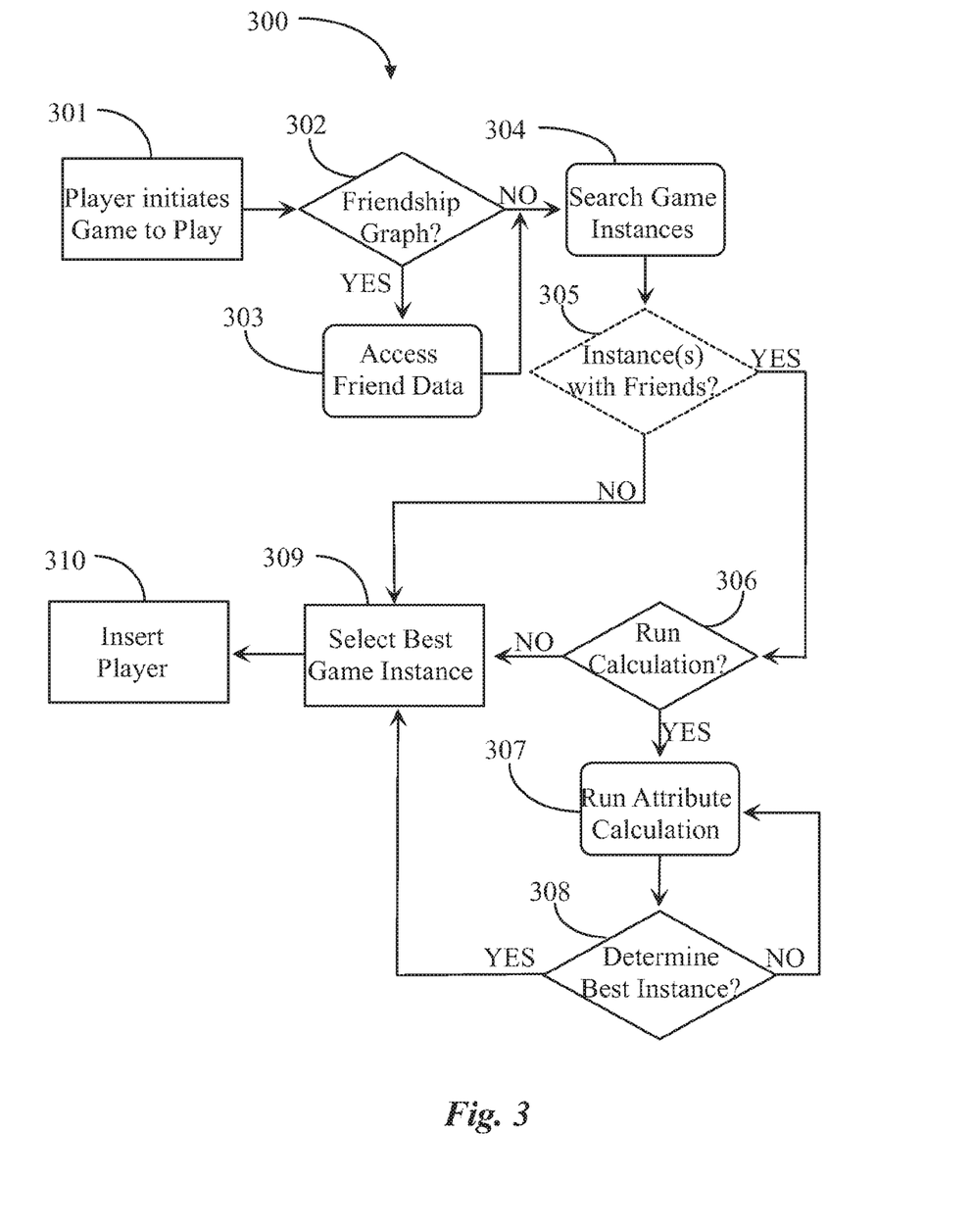
FIG. 3 is a process flow chart depicting steps for selecting a best game for insertion of a player according to an embodiment of the present invention.

FIG. 3 is a process flow chart 300 depicting steps for selecting a best game instance from multiple game instances for insertion of a player according to an embodiment of the present invention. At step 301, a player analogous to one of player's 107-109 selects and initiates play of a game. It may be assumed herein that the player is logged into the gaming service. At step 302 it may be determined whether or not the player has a friendship graph. It is a possibility though not likely, that the player has no friends on the gaming service.

If determined at step 302 that the player has no friend graph data, the process may move to step 304 where the data server analogous to server 111 of FIG. 1 may search for running game instances on the game server or servers. In this process, step 304 includes the redirect to the data processing server. Since the player has no friends and hence no player graph data in this instance, the process may move directly from step 304 to step 309 where the server aided by SW may select a best game instance for the player according to criteria other than friend data. Step 305 (broken decision boundary) is reserved for a player with friend graph data. The process may then culminate at step 310 where the server inserts the player into the game connecting the player to the appropriate game server and running game instance.

If determined at step 302 that the player has a friendship graph, the friend graph data may be accessed directly or by reference link at step 303. In one implementation, updated friend graph data for the player may be periodically sent to a data server so that it may be available locally. In another implementation, friend graph data is referenced in a database local to the Web server by link so that the data server matching players to game instances may use the link to access the data. The process moves from step 303 to step 304 where the data server searches for instances of the player's game that include one or more friends of the player engaged as discovered using the player graph data.

At step 305, the server may determine if there are any game instances running on the game server or servers that include friends of the player engaged and playing those game instances. It is possible that no running instances of the player's selected game include friends of the player engaged in game play. At step 305, if it is determined that there are no game instances on the server or servers that include the player's friends, the process may move to step 309 where the server may select a game instance for insertion based on other criteria and then on to step 310 where the player may be inserted (connected to server and game).

If it is determined at step 305 that there are one or more game instances found that include one or more friends of the player, the process may move to step 306 where the server aided by SW 112 may run a calculation to compare player graph data points relative to each friend in association with the particular game instance considered. In one implementation a calculation at step 306 may not be required if the match is made on the most basic level, that is one game instance has one or more friends while no other game instances with friends playing are found. In such a case, the process may move to step 309 where the server selects the game with friends and inserts the player into the game at step 310.

It is noted herein that a step may be provided with or after step 305 that qualifies whether a game instance is full, meaning it cannot accept any more players unless one or more players drop out. In this case such instances may be ignored even though there are friends of the player engaged. In one implementation there may be a small buffer provided to game player capacity that might accept one more player such as a "super max" level that may be an absolute limit.

If it is determined at step 306 to run a calculation to help determine which game instance will be selected, the process moves to step 307 where the calculation is executed by the SW. An attribute calculation is a weighted comparison of the isolated data sets representing friend models and attributes for each friend of the player engaged in an instance of the game that the player initiated. At step 308 it may be determined whether or not the best game instance emerged from the calculation of step 307. If no determination is made as to best game in step 308, the process may loop back for another calculation round at step 307.

It is noted that each calculation round may be performed at a higher level than the preceding calculation round relative to considering attributes of the friend models representing the player's friends actively playing a game instance. Attributes may include "state" attributes such as "who friended who" (friending action) and "who is following who" (following state), and number of mutually shared friends. Other attributes that might be considered in a calculation round may include shared activity values that may be continually updated as they occur between friends such as number of games played together over a span of history or the number of chat interactions engaged in with one another, etc. In one implementation only one calculation may be required to positively determine a best game instance for the player. In another implementation further rounds may be required using more attributes each time until a best game instance emerges due to heavier score or weight than other game instance candidates.

If a best game instance for the player is determined at step 308, the process moves to step 309 where the server selects the game instance for service. At step 310, the server inserts or connects the player to the game server and to the particular game instance selected. In all implementations there may be a set of rules or constraints that may govern comparison of friend models, including associated attributes. More detail about attributes and how they may be considered in weighting during calculation such as in step 306 is provided later in this specification.

Figure 4:
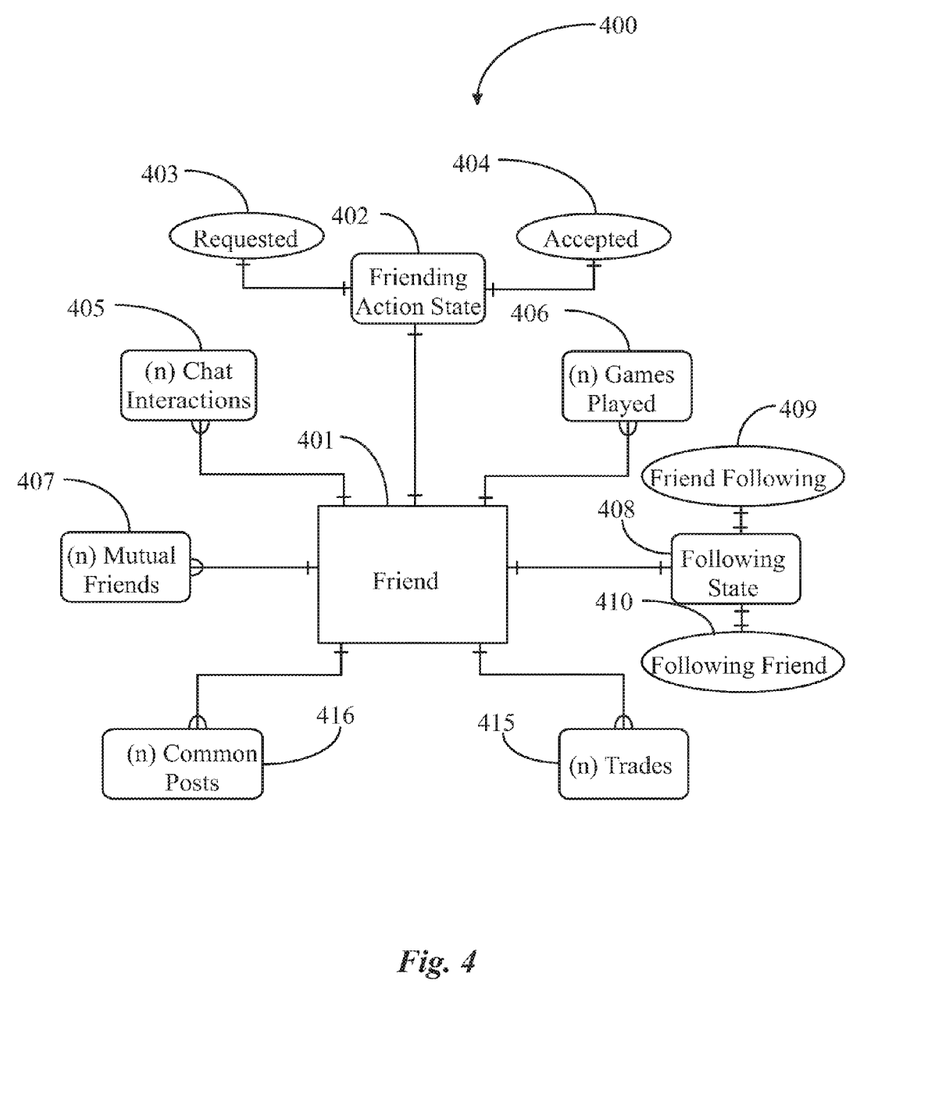
FIG. 4 is a block diagram depicting a friend model and attributes that may be used in a weighting algorithm to select a best game instance for player insertion.

FIG. 4 is a block diagram depicting a friend model 400 and associated attributes that may be used in a weighting algorithm to select a best game instance for player insertion. Model 400 has a parent module abstract 401, which represents an identified friend of a player. Without attributes the only data known would be that module 401 is a friend of the players and has identification (basic attribute). In one implementation a game instance could be selected based only on this data at a lowest calculation level.

Friend 401 includes a friending action state attribute 402 that indicates whether the friend originally requested friendship or accepted a friendship request from the player. Friending state attribute 402 may include a flag 403 indicating that the friend requested friending action from the player, and a flag 404 indicating that the friend accepted a friendship request from the player. Either indication may be a permanent data attribute to action state 402. In one implementation, a higher value may be put on a friend of the player who accepted a friend request from the player than one who sent a friend request to the player that was accepted by the player. In this way attributes of the friend model 400 may be used with rules and constraints to score friendship value of the particular player's friends in any running game instance.

Friend 401 includes a mutual friends attribute 407 that simply states the number of mutually held friends that exist between the player and the friend. Friend 401 may include a following state attribute 408 that indicates the current following state between the player and the friend. Following state attribute 408 may have a flag 409 that indicates that the friend is following the player and a flag 410 indicating that the player is following the friend. These states may change and may be updated to model 400 when a change in state occurs from either end.

Friend 401 may include a chat attribute 405 that indicates a number value (n) representing the total number of chat interactions shared between the player and friend 401. Friend 401 may include a games attribute 406 that indicates a number value (n) representing the total number of games that the player and friend have played together.

Friend 401 may include a posts attribute 416 that indicates a number value (n) representing the number of posts that both the player and the friend posted in. Friend 401 may include a trades attribute 415 that indicates a number value (n) representing the total number of game relative trades, item swaps or transactions that occurred between the player and the friend. Friend 401 may include other attributes than those depicted here without departing from the spirit and scope of the present invention. Similarly, the friend attributes may include further attributes as children, etc. It may be noted herein that number value (n) may be zero or more than zero. It may also be noted herein that friendship models like model 400 are modular and may be deleted or neutralized from a friendship graph in the case of an un-friending event.

Figure 5:
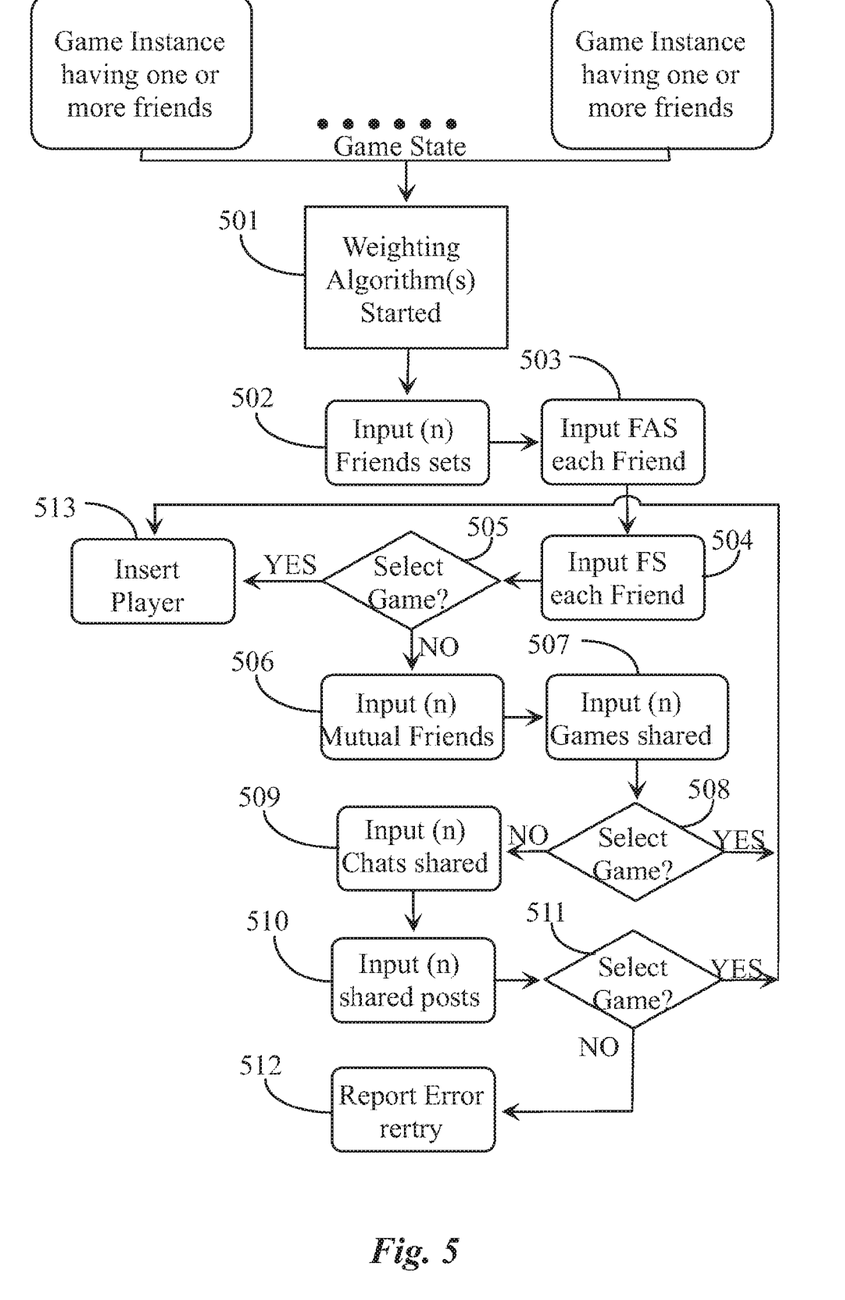
FIG. 5 is a process flow chart depicting steps for selecting one of multiple running game instances having active friends for player insertion based on weighted score comparison of friend attributes.

FIG. 5 is a process flow chart 500 depicting steps for selecting one of multiple running game instances having active friends for player insertion based on weighted score comparison of friend attributes. This example assumes that a player has selected a game and has a friend graph and that multiple running game instances were found having one or more of the player's friends engaged in play. At step 501 the data server aided by SW (112) may determine to run a weighting algorithm. In one implementation more than one weighting algorithm may be started to handle different aspects of comparison of the data sets.

At step 502, the SW may input a number value (n) of friends associated with each running game instance. This step may include the identification of each of the friends. At step 503 the SW may input friend action state data for each of the friends. It is noted herein that the friend data may be segregated by friend identification and by the boundary of the domain of the running game instance that the friends are engaged in playing. At step 504 the SW may input the following state data for each of the friends. It is noted herein that steps 503 and 504 may be arbitrary relative to the input attribute data. For example, the process may input other attributes in place of or in addition to those mentioned. Calculation steps are assumed at each input of data.

At step 505 it may be determined whether enough data has been compared and scored to reveal a best game instance for the player. Step 505 may or may not follow step 504 as there may be more or fewer input steps before a determination might be made to best game instance for the player. However, the process may resolve to a decision step periodically to save time in process. In another implementation, a decision step may not be taken until all available data has been compared. If at step 505 a best running game instance is selected, the data server may insert or connect the player to the server and the game instance selected at step 513, ending the process for that player.

If it is determined not to select a best running game instance in step 505, the process may move to step 506 where the number value (n) representing number of mutual friends between the player and each of the friends may be input into the weighting algorithm as yet another attribute to consider (compare). At step 507, the SW may input a number value (n) representing the total number of games that the player and each of the friends shared or played together. It is noted herein that each additional input of attribute data flows to the associated model data for each friend and further segregated by running game instance. In this way weighting produces an overall score for each running game instance based on the value of the friend information bounded to each running instance.

It may be noted herein that a friend may log out or drop out of a game during calculation. There may be a mechanism for fixing the score of a running game instance in that case such that the overall score may be recalculated based on the loss of the friend data associated with the dropped friend. It may also be noted that a running game instance may have a single friend that may drop off during processing or weighting. In this case the game instance may be ignored or neutralized from selection. Likewise, a friend may pop into a game during weighting thus changing the calculation for that instance. The total time for determining the best game should not adversely affect the player so calculations and scoring are performed at a high level of computation in the server including up scaling to more than one server performing the process for players in real time.

At step 508 it may be determined whether or not to select a game instance for the player. It may be that a clear winner (game instance) has emerged from calculation. It is not required that a decision step immediately follow step 507. If at step 508 the best game is identified and selected, the process may end for that player with connection into the game at step 513. If it is determined not to select a game instance for the player at step 508, the process may move back to accepting more attribute input. At step 509, the SW may input the number value (n) of chat interactions shared between the player and each of the friends. At step 510, the SW may input the number value (n) of shared posts between the player and each of the friends for each game instance.

A step 511 it may be determined whether to select a best game instance for the player. It is again noted that there may be more or fewer attributes input into the weighting routine than were depicted in this process. Moreover, all of the data may be input into the weighting algorithm in one step without departing from the spirit and scope of the invention. There may be one or more than one determination or decision step where it may be determined if a clear winner (game instance) is identified by high score. There may be other friend attributes that may be considered without departing from the spirit and scope of the present invention. Moreover, weighting constraints may also include friend data such as age, gender, and other basic criteria.

If it is determined to select a game instance at step 511, then the process may move to step 513 for player inserting or connection to the particular server and game instance. If the system still cannot determine a clear game instance that is best for the player, the system may report an error or may rerun the calculations. It may be perceived that at each instance of a player having a friend graph and selecting a particular game to play, the process of coming to resolution of a clear game instance that is best for the player may occur very quickly using only a fraction of the available model data. In some cases, decisions may require more data input requiring further steps of input at higher levels.

In one implementation a player may have an ability to list certain friends with whom that they wish to be matched during game play. Likewise, a player may have a list of players with whom they do not want to share a game, but wish to stay friends with just the same. In one implementation that information may be available as a player addition or customization to the friend graph. In another implementation, when the system discovers friends in multiple game instances considered for a player, and transfers the player into one of those available game instances, the system might also invite the other friends of the player to transfer to the instance that the player is in.

It will be apparent to one with skill in the art that the recommendation system of the invention may be provided using some or all of the above-described features and components without departing from the scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A method, comprising:
presenting to a player connecting to a web site executing on a processor of a web-connected server, from a non-transitory medium, a plurality of links to games available for the player to play;
selecting, by the player, one of the links to an available game;
determining by software executing on the processor on the network-connected server, instances of the selected game already in progress;
accessing stored information regarding friends of the player;
determining if one or more friends of the player are engaged in one or more of the games already in progress; and
connecting the player, without further interaction by the player, to a particular one of the games already in progress wherein one or more friends of the player are engaged.

2. The method of claim 1 wherein the stored information regarding friends of the player includes friend identities, and additional instances of information regarding past associations between the player and each of the friends.

3. The method of claim 2 wherein the instances of stored information are weighted, and used to determine which one of multiple games in progress involving friends of the player, that the player will be directed to play.

4. The method of claim 3 wherein the instances of stored information include one or more of information regarding common posts, number of games played together in the past, total time playing in a common game, numbers and identities of mutual friends, following state, chat interaction history with the friends, and transaction history with the friends.

5. The method of claim 3 wherein the stored information regarding friends of the player includes the player's preferences for friends to be joined in a game, and wherein the system uses the preferences in determining which one of multiple games in progress involving friends of the player, that the player will be directed to play.

6. The method of claim 5 wherein the preferences of the player include a preference to not play in a same game with individual ones of the friends.

7. The method of claim 5 wherein friends of the player are assigned a priority between no play and always OK to play in the same game.

8. A system, comprising:
 a network-connected server executing software on a processor from a non-transitory medium;
 a game server running games in which individual second players are engaged; and
 a data repository storing information regarding friends of a player;
 wherein, presenting to a player connecting to a web site hosted by the game server, a plurality of links to games available for the player to play, the player selects one of the links to an available game, the system determines instances of the selected game already in progress, accesses the stored information, determines if one or more friends of the player are engaged in one or more of the games already in progress, and connects the player, without further interaction by the player, to a particular one of the games already in progress wherein one or more friends of the player are engaged.

9. The system of claim 8 wherein the stored information regarding friends of the player includes friend identities, and additional instances of information regarding past associations between the player and each of the friends.

10. The system of claim 9 wherein the instances of stored information are weighted, and used to determine which one of multiple games in progress involving friends of the player, that the player will be directed to play.

11. The system of claim 10 wherein the instances of stored information include one or more of information regarding common posts, number of games played together in the past, total time playing in a common game, numbers and identities of mutual friends, following state, chat interaction history with the friends, and transaction history with the friends.

12. The system of claim 9 wherein the stored information regarding friends of the player includes the player's preferences for friends to be joined in a game, and wherein the system uses the preferences in determining which one of multiple games in progress involving friends of the player, that the player will be directed to play.

13. The system of claim 12 wherein the preferences of the player include a preference to not play in a same game with individual ones of the friends.

14. The system of claim 12 wherein friends of the player are assigned a priority between no play and always OK to play in the same game.

\* \* \* \* \*